United States Patent [19]

Govind

[11] Patent Number: 4,615,770
[45] Date of Patent: Oct. 7, 1986

[54] DISTILLATION COLUMN AND PROCESS

[76] Inventor: Rakesh Govind, 14092 Stone Ct., Cincinnati, Ohio 45242

[21] Appl. No.: 705,413

[22] Filed: Feb. 26, 1985

Related U.S. Application Data

[63] Continuation of Ser. No. 541,991, Oct. 14, 1983, abandoned.
[51] Int. Cl.$^4$ .................... B01D 3/26; B01D 1/28
[52] U.S. Cl. .................... 203/25; 203/26; 203/74; 202/154; 202/158; 202/237
[58] Field of Search ............ 202/158, 159, 154, 153, 202/168, 236, 237; 203/24-26, 72-85, 100; 62/34; 196/100, 110, 120, 134

[56] References Cited

U.S. PATENT DOCUMENTS

| | | | |
|---|---|---|---|
| 1,257,470 | 2/1918 | Filippo et al. | 202/158 |
| 2,070,100 | 2/1937 | Twomey | 202/158 |
| 2,231,828 | 2/1941 | Kerr | 202/158 |
| 2,317,101 | 4/1943 | Lecky | 202/158 |
| 2,578,469 | 12/1951 | Goldsbarry et al. | 196/105 |
| 2,760,351 | 8/1956 | Schilling | 62/34 |
| 3,003,930 | 10/1961 | Pugh et al. | 202/158 |
| 3,098,107 | 7/1963 | Becker | 203/26 |
| 3,189,531 | 6/1965 | Hack et al. | 202/154 |
| 3,563,047 | 2/1971 | Hoffman | 62/39 |
| 3,568,461 | 3/1971 | Hoffman | 202/158 |
| 3,632,334 | 1/1972 | Quintin | 202/158 |
| 3,844,898 | 10/1974 | De Graff | 202/154 |
| 3,959,085 | 5/1976 | De Graff | 202/158 |
| 4,025,398 | 5/1977 | Haselden | 202/154 |
| 4,234,391 | 11/1980 | Seader | 202/154 |
| 4,306,940 | 12/1981 | Zenty | 203/26 |
| 4,308,107 | 12/1981 | Markfort | 202/158 |

FOREIGN PATENT DOCUMENTS

| | | |
|---|---|---|
| 1917750 | 10/1970 | Fed. Rep. of Germany. |
| 2044346 | 3/1972 | Fed. Rep. of Germany. |
| 2149155 | 4/1973 | Fed. Rep. of Germany. |
| 1362825 | 8/1974 | United Kingdom. |
| 2111852 | 7/1983 | United Kingdom. |

OTHER PUBLICATIONS

Tyreus, B. D. et al., "Two Towers Cheaper Than One?", Hydrocarbon Processing, Jul. 1975, pp. 93-96.
O'Brien, N. G., "Reducing Column Steam Consumption", CEP, Jul. 1976, pp. 65-67.
Petterson, W. C. et al., "Energy-Saving Schemes In Distillation", Chemical Engineering, Sep. 26, 1977, pp. 79-86.
Mah, R. S. H. et al., "Distillation With Secondary Reflux and Vaporization: A Comparative Evaluation", AIChE Journal, Sep. 1977, vol. 23, No. 5, pp. 651-658.
Kayihan, F., 70th Annual AIChE Meeting, "Optimum Distribution of Heat Load In Distillation Columns Using Intermediate Condensers & Reboilers", Nov. 13-17, 1977.
Fitzmorris et al., "Improving Distillation Column Design Using Thermodynamic Availability Analysis", AIChE Journal, vol. 26, No. 2, Mar. 1980, pp. 265-273.
Shimizu, K. et al., "Dynamic Characteristics of Binary SRV Distillation Systems", Computers and Chemical Engineering, vol. 7, No. 2, pp. 105-122, 1983.
Rathore, Ram N. S., "Reusing Energy Lowers Fuel Needs of Distillation Towers", Chemical Engineering, Jun. 14, 1982, pp. 155-159.
Schluter, L. et al., "A Present Trend in Rectification: Energy Saving", International Chem. Eng., vol. 23, No. 3, Jul. 1983, pp. 427-438.

Primary Examiner—Wilbur Bascomb
Attorney, Agent, or Firm—Wood, Herron & Evans

[57] ABSTRACT

Dual interrelated distillation columns are disclosed wherein the heat from a first column is transferred by thermal conduction through a common wall or surface to a second column to increase efficiency and decrease waste of energy. In one embodiment, the first heat generating column is a cylindrical column, and the second column is an annular column concentric to the first column. This concentric arrangement permits the heat generated in the first column to flow outwardly into the second column, thereby improving its efficiency and reducing the heat loss. Typically, the inner first column is a high pressure rectifying column, and the outer concentric column is a stripping column. In an alternate embodiment, the inner column can simply be a portion of a high pressure distillation process, and the outer column is a portion of a lower pressure distillation column. In alternate embodiments, the rectifying apparatus can assume a variety of shapes such as a plurality of packed tubes which extend through the stripping column or a corrugated configuration or rectangular configuration as desired.

11 Claims, 4 Drawing Figures

DISTILLATION COLUMN AND PROCESS

This application is a continuation of application Ser. No. 541,991, filed Oct. 14, 1983, now abandoned.

BACKGROUND OF THE INVENTION

The distillation process requires more energy than any other single operation in the entire chemical industry. Despite this, distillation is still, in many applications, a preferred separation method. In many situations, distillation is the only means to separate two or more combined materials.

Distillation involves stripping and rectifying, both typically conducted in the same tower at different heights along the tower. In the lower portion of the tower below the feed tray, a mixture is heated causing it to boil. The generated vapors pass upwardly through the column. At the feed tray, the same mixture in liquid form is injected into the column. This liquid flows downwardly, contacting the rising vapors. The vapors preferentially strip the more volatile components of the mixture from the downwardly flowing liquid. Vapors continue to rise upwardly into the upper rectifying portion of the tower and pass completely out of the column. A portion of these vapors are condensed and injected at the top into the column at its highest point. This condensed liquid contacts the upwardly flowing vapors causing the less volatile material to condense.

The separation occurring in the stripping section is effected by the vaporization of the more volatile component. The separation in the rectifying section is caused by the condensation of the less volatile material. As such, in order to improve efficiency, it would be desirable to heat the stripping section and to cool the rectifying section. To make the separation most effective, it is desirable to actually place heat exchangers within the distillation column. At the upper rectifying sections, cooling units should be used. At the lower stripping sections, heaters should be used.

For separation purposes, this is very efficient; economically, this is very inefficient. The capital cost for providing multiple heat exchangers in very long columns makes this impractical.

A recent development has been to use split columns, separate stripping and rectifying columns. In such systems, the gas evolved from the stripping column is directed to the rectifier column, and the liquid condensate from the rectifier is returned to the upper portion of the stripping column. Such units have been further modified by using heat exchangers between the stripping column and the rectifier. Thus, the excess heat evolved in the rectifier is transferred to the stripping column to provide the additional needed heat for the stripping operation. Further unwanted heat in the rectifier is removed. Such an apparatus is disclosed in Haselden U.S. Pat. No. 4,025,398.

Again, the problem with such a system is that it is extremely complex and very capital intensive. The heat exchangers require a large deal of capital expenditure and furthermore are not completely efficient. Further, gas liquid contact within the column is decreased because of the interferences caused by the heat exchangers.

SUMMARY OF THE INVENTION

Applicant's invention is premised upon the realization that in a dual column system, the capital cost is substantially reduced and heat transfer efficiency improved dramatically by providing a first separation apparatus or column in direct thermal conductive contact with a second column whereby heat is transferred from one column to the other by thermal conduction through a common wall. Preferably, a first column is encased within a second column with the interior column being a rectifier, and the exterior column being a stripping column, preferably an annular column. Such an apparatus does not require the expensive coils required for the heat exchanger is Haselden. Further, the heat exchange approaches 100% efficiency because the heat from the rectifier has nowhere to go except to the stripping column. Since the stripping column is at a lower pressure and lower temperature than the rectifier column, the heat will naturally tend to go to the stripping column where it will improve the efficiency of the stripping column.

This concentric design can be employed where two separate distillation operations are conducted in two separate towers and where one of the columns operates at a lower temperature pressure than the other. The rectifying section of the higher temperature column is located within the stripping section of the lower temperature column.

Further, the present invention provides greater efficiency because the annular stripping column is substantially more effective than the typical cylindrical column.

The invention and its advantages will be more fully appreciated in light of the following detailed descriptions and drawings in which:

DETAILED DESCRIPTION

Figure 1:
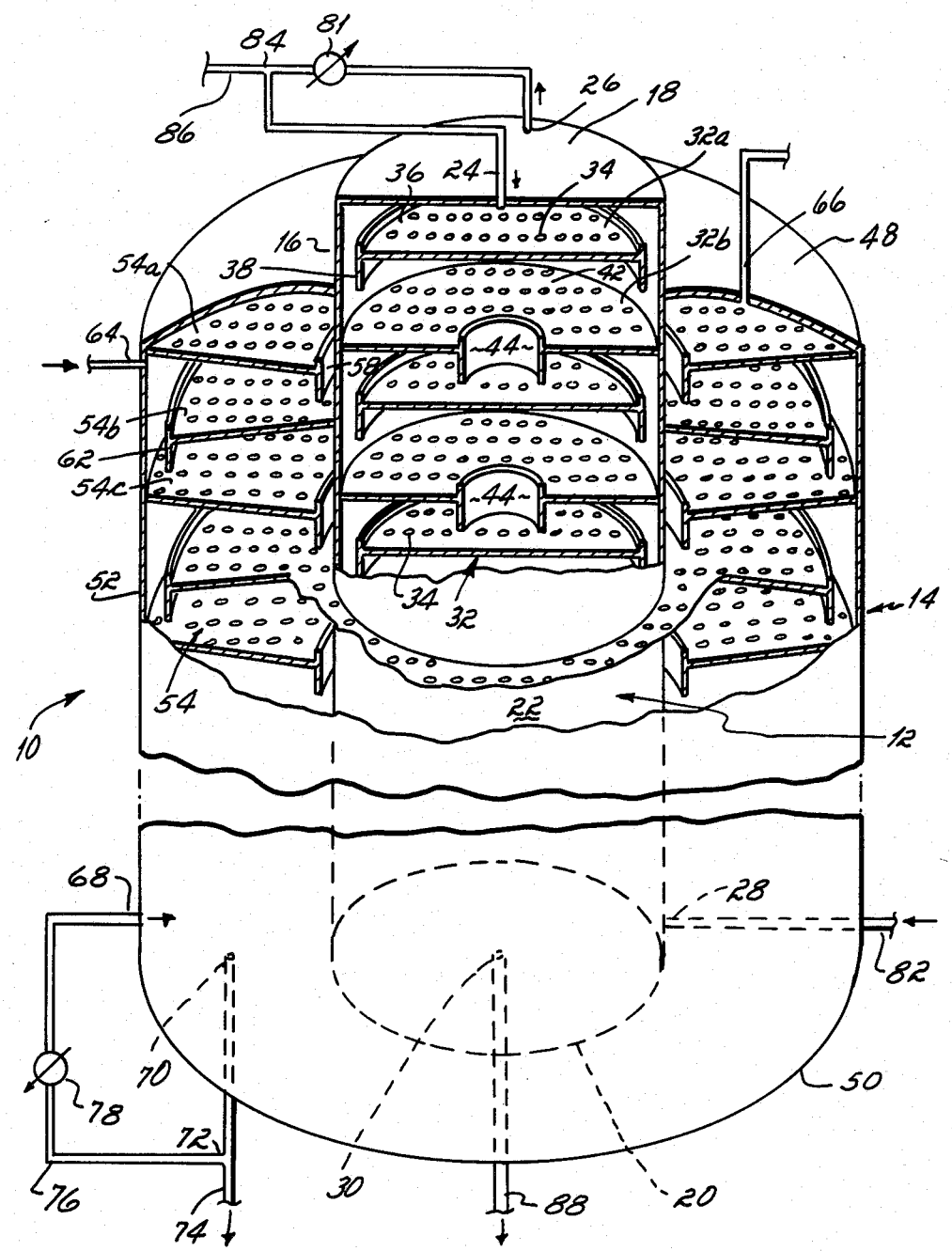
FIG. 1 is a schematic diagram of the present invention.

As shown in FIG. 1, there is a distillation apparatus 10 including an inner rectifying column 12 and a concentric annular stripping column 14. The rectifying column is of typical design including an outer casing 16, including a top 18, a bottom 20 and a cylindrical outer wall 22.

The rectifying column 12 includes an upper liquid inlet 24 directing condensed liquid to the center of the column. Further, the column 12 also includes a distillate vapor outlet 26 extending from the top 18. The bottom 20 of column 12 includes a vapor inlet 28 and a liquid outlet 30. The interior of the column 12 is filled with some type of packing. As shown in FIG. 1, a plurality of foraminous vapor-liquid contact plates 32 fill the column. Perforations 34, through these plates, permit gas flow and facilitate gas liquid contact.

Alternate plates are designed to direct the liquid flow over the foraminated surface of the plates, and either towards the center of the column or towards the outer wall 22 of the column. For example, a first plate 32a includes a circular foraminated top surface 36 with a downwardly extending annular peripheral flange 38. Plate 32a and flange 38 are separated from the rectifier column wall 22, permitting fluid to flow between flange 38 and wall 22 down to the next lower plate 32b. Plate 32b is a downwardly sloped annular foraminated surface 42 with a central opening 44. Plate 32b directs liquid falling from plate 32a across surface 42 through opening 44 and to the next lower plate 32c. Plate 32c is substantially identical to circulate plate 32a. The plates alternate between circular and annular foraminated plates providing a flow path alternately towards or away from the wall 22.

The stripping column 14 is annular in configuration having an inner wall, an outer wall 52 connected by top 48 and bottom 50. Preferably, outer wall 22 of the rectifying column serves as the inner wall of the stripping column. Alternately, the stripping column could have a separate inner wall which surrounds and contacts the outer wall of the rectifying section. This would facilitate separation of the rectifying and stripping columns should this be desired.

Like the rectifying section, the stripping column includes a gas liquid contact area. As was the case with the stripping column, this gas liquid contact area comprises a plurality of foraminated plates 54 which alternately direct downward flowing liquid either towards outer wall 52 or toward the wall 22.

As shown in FIG. 1, a first plate 54a is an annular foraminated plate welded to the outer wall 52 and sloping downwardly towards wall 22. It includes an inner peripheral flange 58. A next lower plate 54b is likewise a foraminated plate which is welded to wall 22. It is sloped downwardly towards the outer wall 52 and ends in an outer annular flange 62. These plates alternate configuration down the stripping column. Directing fluid flow against inner wall 22 promotes heat exchange between the inner and outer columns.

The stripping column, as with the case with most stripping columns, includes a mixture or feed inlet 64, a distillate outlet 66 extending from the top 48 of the stripping column, a vapor inlet 68 entering a lower portion of the column, and a bottoms outlet 70 extending from the bottom 50 of the column 14.

The distillation apparatus described can be used in a joint operation wherein the vapor removed from the stripping column is fed through the rectifying column, and the liquid removed from the rectifying column is fed back to the stripping column. Or alternately, the internal rectifying section could be operated totally separately from the annular stripping column, both having separate feeds and separate products.

Figure 2:
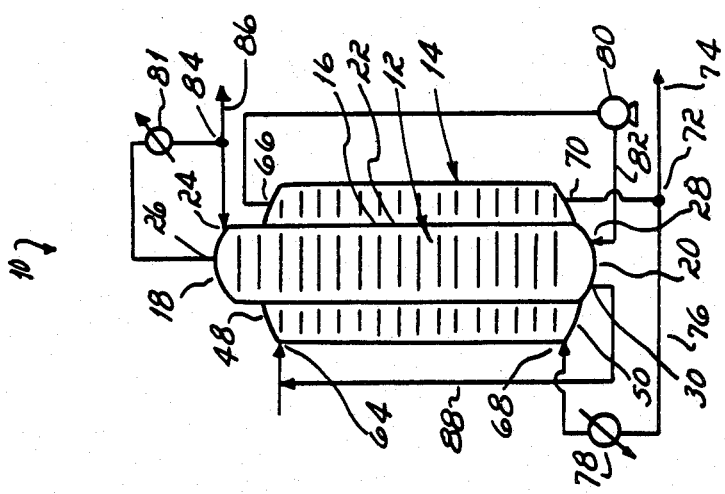
FIG. 2 is a cross section diagrammatical view of the stripping and rectifying sections of the present invention detailing the trays.

The present invention wherein the stripping and rectifying columns are used jointly to separate components from one feed is diagrammatically detailed in FIG. 2. In this operation, the unprocessed feed enters the stripping section 14 through inlet 64 as a liquid vapor or mixture of vapor and liquid, and passes downwardly through the columns. Liquid is withdrawn from the bottom outlet 70 and is directed at a junction 72 either through line 74 to a collector (not shown) or through line 76 to a reboiler 78. Reboiler 78 heats this liquid until boiling, directing the generated vapor into the bottom of the stripping section at vapor inlet 68. This vapor acts to strip the more volatile components from the downflowing feed.

Vapor stripped from the downflowing feed is removed from the stripping column 14 at outlet 66 and is directed to a compressor 80 which compresses the vapor and forces it via line 82 into the inlet 28 in the bottom 20 of the rectifying section 12.

Condensed distillate is directed via inlet 24 into the rectifying section where it flows downwardly contacting the upwardly flowing vapors injected through vapor inlet 28. The rectified vapors exit the rectifying section through distillate outlet 26 where it passes to a condenser 81. Condenser 81 condenses the distillate from the rectifying column, directing it to a junction 84 which splits the condensed liquid directing a portion towards the inlet 24 and the remaining portion to a collection station via line 86.

Liquid passing from the rectifier through outlet 30 is directed via line 88 back to the feed for the stripping section. In this operation, the rectifying column is operated at a higher pressure and higher temperature than the stripping column. The overall efficiency of the rectifier is improved because the stripping section in thermal contact with the exterior wall of the rectifying section draws heat by conduction from the rectifier. Since there is a common surface between the inner column and the outer column, heat is transferred from one column to the second column by conduction through this common wall. The stripping section is more efficiently operated because the heat absorbed from rectifier reduces the amount of heat required from the reboiler. Thus, the energy taken from the rectifier directly reduces the energy required to activate or run the reboiler.

Figure 3:
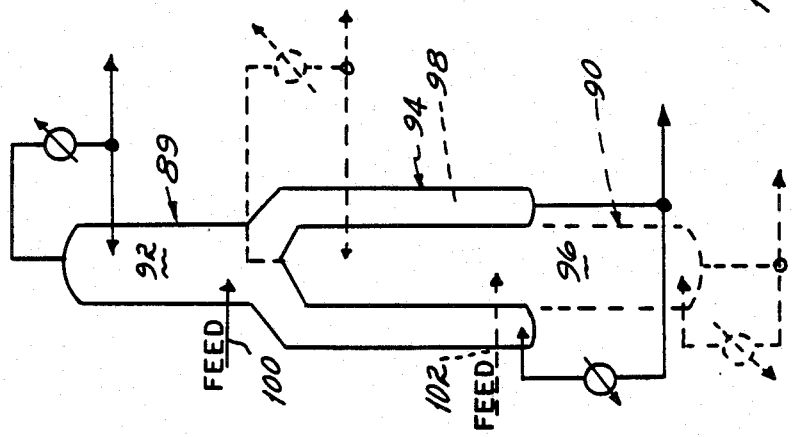
FIG. 3 is a diagrammatic depiction of an alternate embodiment of the present invention.

The biggest problem with this method is that the joint operation of the stripping and rectifying columns requires the use of a compressor. Although compresses per se are not expensive, they tend to fail easily and end up being the weak link in the flow diagram. As shown in FIG. 3, the need for a compressor can be overcome. In this embodiment, a low pressure or temperature distillation apparatus 89 and a higher pressure or temperature distillation apparatus 90 are used together to take advantage of the present invention. In the drawings, FIG. 3, the high pressure apparatus 90 is shown in broken lines to distinguish the two apparatus. The low pressure distillation apparatus 89 includes a cylindrical rectifying section 92 in communication or on top of an annular stripping section 94. The high pressure distillation apparatus 90 includes a cylindrical rectifying section 96 and an annular stripping section 98. Since the high pressure annular stripping section 98 surrounds and is concentric to the low pressure rectifying section 92, the thermodynamic efficiency of the present invention is taken advantage of, i.e., heat is conducted through a common surface from one rectifying section 92 into a concentric annular stripping section 98. In this particular embodiment, since the rectifying and stripping sections of both distillation apparatuses 89 and 90 are combined together, i.e., neither column is split, there is no need to employ a compressor.

As shown in this embodiment, there are two separate feeds, 100 and 102, which can potentially be feeding the same raw material mixture or a totally different mixture to be separated.

Figure 4:
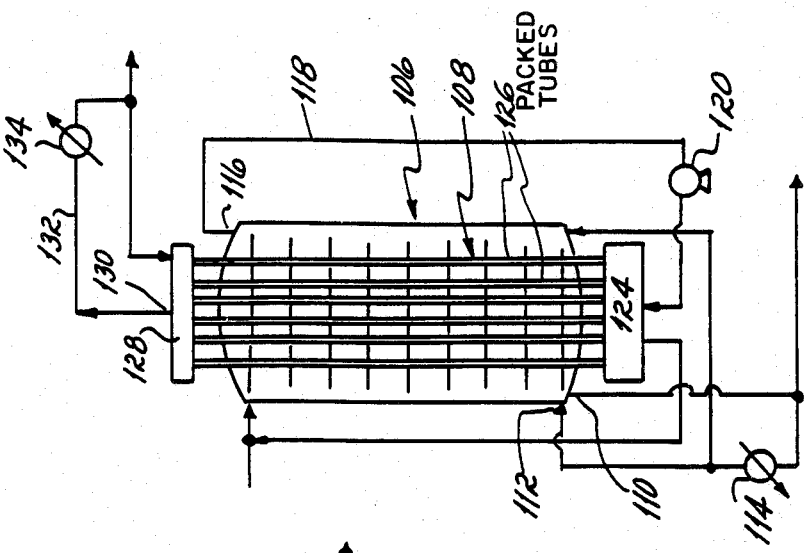
FIG. 4 is a diagrammatic depiction of a second alternate embodiment of the present invention.

In a second alternate embodiment shown in FIG. 4, the rectifying column of FIGS. 1 and 2 is replaced by packed tube bundle. In this embodiment, there is a stripping column 106 having feed, a bottom outlet 110 and a vapor inlet 112 directed from reboiler 114. A distilled vapor outlet 116 directs distilled vapor via line 118 to compressor 120 which directs the compressed vapor into a rectifier 108. Rectifier 108 includes a bottom plenum 124 which communicates with a plurality of packed tubes 126 which extend through the interior of column 106. The interior of the tubes are packed with, for example, ceramic beads or glass. If the tubes are wide enough, they could also be packed with normal gas liquid contact trays. Tubes 126 extend upwardly to an exhaust manifold 128 which includes a distillate outlet 130 leading via line 132 to a condenser 134. Condense 134 condenses the distillate vapor and directs a portion of the condensed liquid back into the manifold 128.

Again, the advantages of the present inventions are realized in this embodiment since the heat from the rectifying section is transferred by conduction through the walls of the tubes into the stripping section. This embodiment would be preferred when additional heat transfer is required from the rectifying section to the stripping section. The tube bundle arrangement simply provides more thermally conductive contact area within the stripping section.

There are several distinct advantages to the design of the present invention. These include increased thermodynamic efficiency because the unwanted heat from the rectifier is removed, thereby improving its separation efficiency. Further needed energy is transferred to the stripping section improving its separation efficiency. Further, there is lower energy consumption because the reboiler in the stripping section can be operated at a lower temperature since additional heat is added along the stripping section. This design is also more compact, allowing the overall height of the distillation apparatus to be at least cut in half.

An ancillary advantage is the tray efficiency in the annular stripping section. The annular tray design itself provides better gas liquid contact because all of the liquid must flow back and forth between the inner and outer wall of the stripping column and across the entire gas liquid contact area of the plate.

The tray designs of the inner rectifying section and the outer stripping section are both cooperatively designed to maximize heat exchange at the common wall 22. Both tray designs direct the flow of liquid towards this wall, providing for efficient heat transfer.

The concentric design of the distillation apparatus of the present invention provides these advantages and can be used in a vast number of situations where this heat transfer from one column to another column is desired. One of ordinary skill in the art will easily appreciate the vast number of different configurations the columns can assume to provide direct heat conduction from the high temperature to the low temperature apparatus. The inner column can assume various shapes such as corrugated or flower petal configuration. It could have a rectangular configuration where the interior column is actually a plurality of packed tubes. The tubes could be used for different separations with different materials. Further, the higher temperature or pressure column or apparatus does not have to be located entirely within lower pressure or temperature column. The two apparatuses must be in direct conductive thermal contact, i.e., have a common wall or have separate walls physically contacting each other.

Accordingly, applicant intends to be bound only by the claims in which, I claim:

1. A distillation apparatus including: a stripping column; and
a rectifying column maintained separate from said stripping column thereby permitting said rectifying column to be maintained at a higher pressure than said stripping column;
said rectifying column comprising a bottom plenum, a top manifold and a plurality of packed tubes extending through said stripping column between said plenum and said manifold, said packed tubes being completely surrounded by said stripping column;
a condensor forming condensed liquid, a condensed liquid inlet connected between said top manifold and said condensor;
a vapor outlet between said manifold and said condensor;
a vapor inlet into said bottom plenum;
said stripping column including a top and a bottom; an unprocessed feed inlet into said top;
a vapor outlet extending from said top; means to introduce vapor into said bottom, a bottoms outlet extending from said bottom;
a vapor liquid contact area between said top and said bottom of said stripping column;
said vapor outlet from said stripping column connected to said vapor inlet into said plenum of said rectifying column; and
a means to compress vapors passing from said vapor outlet from said stripping column, said means being connected to said vapor inlet into said bottom plenum of said rectifying column thereby increasing the pressure within said rectifying column.

2. A method of distilling components from a liquid comprising admitting a first liquid into a top section of a stripping column permitting said first liquid to flow downwardly through stripping column to a reboiler;
heating said first liquid in said reboiler thereby generating a first vapor stream and admitting said first vapor stream into the bottom of said stripping column whereby said vapor stream passes upwardly through said stripping column into contact with said first liquid thereby forming a second vapor stream including a component stripped from said first liquid;
passing said second vapor stream from the top of said stripping column to a compressor;
compressing said second vapor stream and admitting said second vapor stream into a bottom portion of a rectifying column;
directing a condensed distillate liquid into a top portion of said rectifying column whereby said distillate liquid flows downwardly contacting said second vapor stream thereby forming a rectified vapor stream; and
removing said rectified vapor stream from the top of said rectifying column and condensing a portion of said rectified vapor stream to thereby form said condensed distillate liquid;
wherein said rectifying column is completely surrounded by said stripping column and in thermal contact with said stripping column and said rectifying column is maintained separate from said stripping column and at a higher temperature and pressure than said stripping column whereby heat from said rectifying section passes outwardly to said stripping column improving the efficiencies of said stripping column and said rectifying column.

3. A distillation apparatus including:
an inner rectifying column said inner rectifying column including a top portion, a bottom portion, and a vapor liquid contact area between said top portion and said bottom portion;

a condensed liquid inlet into said top portion of said rectifying column;

a vapor outlet from said top portion of said rectifying column;

a vapor inlet into said bottom portion of said rectifying column;

a condensor mounted inline between said condensed liquid inlet into said top portion of said rectifying column and said vapor outlet from said top portion of said rectifying column whereby vapor passing from said top of said condensor through said vapor outlet is condensed by said condensor and directed into said rectifying column through said condensed liquid inlet;

an outer stripping column maintained separate from said rectifying column to permit said rectifying column to be maintained at a higher pressure than said stripping column, said stripping column and said rectifying column separated by a common heat exchange surface and said stripping column completely surrounding said rectifying column;

said stripping column including a top portion and a bottom portion;

an unprocessed feed inlet into said top portion of said stripping column;

a vapor outlet extending from said top portion of said stripping column;

means to introduce vapor into said bottom of said stripping column;

a bottom outlet extending from said bottom portion of said stripping column;

a vapor liquid contact area between said top portion and said bottom portion of said stripping column;

a means to compress vapor from said vapor outlet from said stripping column;

said means to compress vapors connected to said vapor inlet into said bottom portion of said rectifying column and thereby operable to increase the pressure within said rectifying column.

4. The apparatus claimed in claim 3 wherein said rectifying column includes a plurality of consecutive vapor liquid contact plates adapted to direct fluid passing over said consecutive plates alternately to a central portion of said column and to said common heat exchange surface.

5. The apparatus claimed in claim 4 wherein said stripping column includes a plurality of consecutive annular vapor liquid contact plates directing fluid passing downwardly through said stripping column over said consecutive plates alternately toward said common heat exchange surface and towards an outer wall of said stripping column.

6. The distillation apparatus claimed in claim 3 wherein said means to compress vapors comprises a compressor.

7. A method of distilling components from a liquid consisting essentially of;

admitting a first liquid into a top section of a stripping column and permitting said first liquid to flow downwardly through the stripping column to a reboiler;

heating said first liquid in said reboiler thereby generating a first vapor stream and admitting said first vapor stream into the bottom of said stripping column whereby said vapor stream passes upwardly through said stripping column into contact with said first liquid thereby forming a second vapor stream including a component strip from said first liquid;

passing said second vapor stream from the top of said stripping column to a compressor;

compressing said second vapor stream and admitting said second vapor stream into a bottom portion of a rectifying column;

directing a condensed distillate liquid into a top portion of said rectifying column whereby said distillate liquid flows downwardly contacting said second vapor stream thereby forming a rectified vapor stream; and removing said rectified vapor stream from the top of said rectifying column and condensing a portion of said rectified vapor stream to thereby form said condensed distillate liquid;

wherein said rectifying column is completely surrounded by said stripping column and in thermal contact with said stripping column and said rectifying column is maintained separate from said stripping column and at a higher temperature and pressure than said stripping column whereby heat from said rectifying section passes outwardly to said stripping column improving the efficiencies of said stripping column and said rectifying column.

8. A distillation apparatus consisting essentially of:

an inner rectifying column said inner rectifying column including a top portion, a bottom portion, and a vapor liquid contact area between said top portion and said bottom portion;

a condensed liquid inlet into said top portion of said rectifying column;

a vapor outlet from said top portion of said rectifying column;

a vapor inlet into said bottom portion of said rectifying column;

a condensor mounted inline between said condensed liquid inlet into said top portion of said rectifying column and said vapor outlet from said top portion of said rectifying column whereby vapor passing from said top of said condensor through said vapor outlet is condensed by said condensor and directed into said rectifying column through said condensed liquid inlet;

an outer stripping column maintained separate from said rectifying column to permit said rectifying column to be maintained at a higher pressure than said stripping column, said stripping column and said rectifying column separated by a common heat exchange surface and said stripping column completely surrounding said rectifying column;

said stripping column including a top portion and a bottom portion;

an unprocessed feed inlet into said top portion of said stripping column;

a vapor outlet extending from said top portion of said stripping column;

means to introduce vapor into said bottom of said stripping column;

a bottom outlet extending from said bottom portion of said stripping column;

a vapor liquid contact area between said top portion and said bottom portion of said stripping column;

a means to compress vapors connected to said vapor inlet into said bottom portion of said rectifying column and thereby operable to increase the pressure within said rectifying column.

9. A distillation apparatus claimed in claim 8 wherein said means to compress vapors is a compressor.

10. The apparatus claimed in claim 8 wherein said vapor liquid contact areas is in said rectifying column comprises a plurality of consecutive vapor liquid contact plates adapted to direct fluid passing downwardly over said consecutive plates alternately to a central portion of said column and to said common heat exchange surface.

11. The apparatus claimed in claim 10 wherein said gas liquid contact area in said stripping column comprises a plurality of consecutive annular vapor liquid contact plates directing fluid passing downwardly through said stripping column over said consecutive plates alternately towards said common heat exchange surface and towards an outer wall of said stripping column.

* * * * *